(12) United States Patent
Chauvel et al.

(10) Patent No.: US 7,174,194 B2
(45) Date of Patent: Feb. 6, 2007

(54) TEMPERATURE FIELD CONTROLLED SCHEDULING FOR PROCESSING SYSTEMS

(75) Inventors: Gerard Chauvel, Antibes (FR); Dominique D'Inverno, Villeneuve-Loubet (FR); Darvin R. Edwards, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 593 days.

(21) Appl. No.: 09/932,361

(22) Filed: Aug. 17, 2001

(65) Prior Publication Data

US 2002/0065049 A1 May 30, 2002

(30) Foreign Application Priority Data

Oct. 24, 2000 (EP) .................... 00402948

(51) Int. Cl.
  *H04B 1/38* (2006.01)
  *G06F 1/32* (2006.01)
  *G06F 9/46* (2006.01)

(52) U.S. Cl. ............... 455/574; 713/322; 713/323; 713/324; 713/375; 718/102; 718/105

(58) Field of Classification Search ............. 455/115.1, 455/67.11; 713/320, 310; 364/189; 395/750
See application file for complete search history.

(56) References Cited

U.S. PATENT DOCUMENTS 5,339,445 A 8/1994 Gasztonyi (Continued)

FOREIGN PATENT DOCUMENTS

EP 0 683 451 A 11/1995

(Continued)

OTHER PUBLICATIONS

F. Bellosa, *OS-Directed Throttling of Processor Activity for Dynamic Power Management*, Technical Report, Online! Jun. 1999, pp. 1-5 (URL .http://www4.informatik.uni-erlangen.de/TR/pdf/TR-14-99-03.pdf); retrieved on Internet on Aug. 12, 2003.

(Continued)

*Primary Examiner*—Fan Tsang
*Assistant Examiner*—Lisa Hashem
(74) *Attorney, Agent, or Firm*—Robert D. Marshall, Jr.; W. James Brady; Frederick J. Telecky, Jr.

(57) ABSTRACT

A multiprocessor system (10) includes a plurality of processing modules, such as MPUs (12), DSPs (14), and coprocessors/DMA channels (16). Power management software (38) in conjunction with profiles (36) for the various processing modules and the tasks to executed are used to build scenarios which meet predetermined power objectives, such as providing maximum operation within package thermal constraints or using minimum energy. Actual activities associated with the tasks are monitored during operation to ensure compatibility with the objectives. The allocation of tasks may be changed dynamically to accommodate changes in environmental conditions and changes in the task list. Temperatures may be computed at various points in the multiprocessor system by monitoring activity information associated with various subsystems. The activity measurements may be used to compute a current power dissipation distribution over the die. If necessary, the tasks in a scenario may be adjusted to reduce power dissipation. Further, activity counters may be selectively enabled for specific tasks in order to obtain more accurate profile information.

15 Claims, 10 Drawing Sheets

U.S. PATENT DOCUMENTS

| | | | | |
|---|---|---|---|---|
| 5,557,551 | A * | 9/1996 | Craft | 702/130 |
| 5,790,877 | A * | 8/1998 | Nishiyama et al. | 713/323 |
| 5,828,568 | A * | 10/1998 | Sunakawa et al. | 700/79 |
| 5,870,614 | A * | 2/1999 | Ang | 713/320 |
| 6,000,036 | A * | 12/1999 | Durham et al. | 713/320 |
| 6,047,248 | A * | 4/2000 | Georgiou et al. | 702/132 |
| 6,158,012 | A * | 12/2000 | Watts, Jr. | 713/322 |
| 6,564,328 | B1 * | 5/2003 | Grochowski et al. | 713/320 |
| 6,587,952 | B2 * | 7/2003 | Lin | 713/322 |
| 6,718,164 | B1 * | 4/2004 | Korneluk et al. | 455/115.1 |
| 6,738,888 | B2 * | 5/2004 | Chauvel | 711/207 |
| 6,751,706 | B2 * | 6/2004 | Chauvel et al. | 711/122 |
| 6,836,849 | B2 * | 12/2004 | Brock et al. | 713/310 |
| 6,848,054 | B1 * | 1/2005 | Watts, Jr. | 713/300 |
| 6,889,330 | B2 * | 5/2005 | Chauvel et al. | 713/300 |
| 6,901,521 | B2 * | 5/2005 | Chauvel et al. | 713/300 |
| 7,062,304 | B2 * | 6/2006 | Chauvel et al. | 455/574 |
| 2002/0147932 | A1 * | 10/2002 | Brock et al. | 713/300 |
| 2004/0133867 | A1 * | 7/2004 | Kitahara | 716/6 |
| 2005/0120069 | A1 * | 6/2005 | Shankar | 708/620 |
| 2005/0216222 | A1 * | 9/2005 | Inoue | 702/136 |

FOREIGN PATENT DOCUMENTS

EP    0 794 481 A    9/1997

OTHER PUBLICATIONS

Texas Instruments Incorporated, U.S Appl. No. 09/696,052, filed Oct. 25, 2000, *Intelligent Power Management for Distributed Processing Systems*.

* cited by examiner

TEMPERATURE FIELD CONTROLLED SCHEDULING FOR PROCESSING SYSTEMS

This application claims priority to European Application Serial No. 00402948.4, filed Oct. 24, 2000 (TI-31362EU). U.S. patent application Ser. No. 6,751,706 (TI-31366US) is incorporated herein by reference.

BACKGROUND OF THE INVENTION

1. Technical Field

This invention relates in general to integrated circuits and, more particularly, to managing energy in a processor.

2. Description of the Related Art

For many years, the focus of processor design, including designs for microprocessor units (MPUs), co-processors and digital signal processors (DSPs), has been to increase the speed and functionality of the processor. Presently, energy consumption has become a serious issue. Importantly, maintaining low energy consumption, without seriously impairing speed and functionality, has moved to the forefront in many designs. Energy consumption has become important in many applications because many systems, such as smart phones, cellular phones, PDAs (personal digital assistants), and handheld computers operate from a relatively small battery. It is desirable to maximize the battery life in these systems, since it is inconvenient to recharge the batteries after short intervals.

Currently, approaches to minimizing energy consumption involve static energy management; i.e., designing circuits which use less energy. In some cases, dynamic actions have been taken, such as reducing clock speeds or disabling circuitry during idle periods.

While these changes have been important, it is necessary to continuously improve energy management, especially in systems where size and, hence, battery size, is important to the convenience of using a device.

In addition to overall energy savings, in a complex processing environment, the ability to dissipate heat from the integrated circuit becomes a factor. An integrated circuit will be designed to dissipate a certain amount of heat. If tasks (application processes) require multiple systems on the integrated circuit to draw high levels of current, it is possible that the circuit will overheat, causing system failure or errant behavior.

In the future, applications executed by integrated circuits will be more complex and will likely involve multiprocessing by multiple processors, including MPUs, DSPs, coprocessors and DMA channels in a single integrated circuit (hereinafter, a "multiprocessor system"). DSPs will evolve to support multiple, concurrent applications, some of which will not be dedicated to a specific DSP platform, but will be loaded from a global network such as the Internet. This is especially true in wireless multimedia appliances domain, where severe cost constraints require the use of a small, low pin count, low cost, packaging technology. Accordingly, the tasks that a multiprocessor system will be able to handle without overheating will become uncertain.

Accordingly, a need has arisen for a method and apparatus for managing energy in a circuit without seriously impacting performance.

BRIEF SUMMARY OF THE INVENTION

The present invention provides a method and apparatus for controlling the execution of multiple tasks in a processing circuit including several modules, where temperature-associated information is determined at various areas of the processing circuit. Tasks are executed on the plurality of modules of the processing circuit responsive to the temperature-associated information in order to prevent problems associated with one or more areas exceeding a temperature threshold.

The present invention provides significant advantages over the prior art by providing a fully dynamic energy management based on the temperature, or estimated temperature, of various areas of a device. As the tasks executed in the device change, the energy management can build new scenarios to ensure that temperature thresholds are not exceeded in any area of the device.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–13 of the drawings, like numerals being used for like elements of the various drawings.

Figure 1:
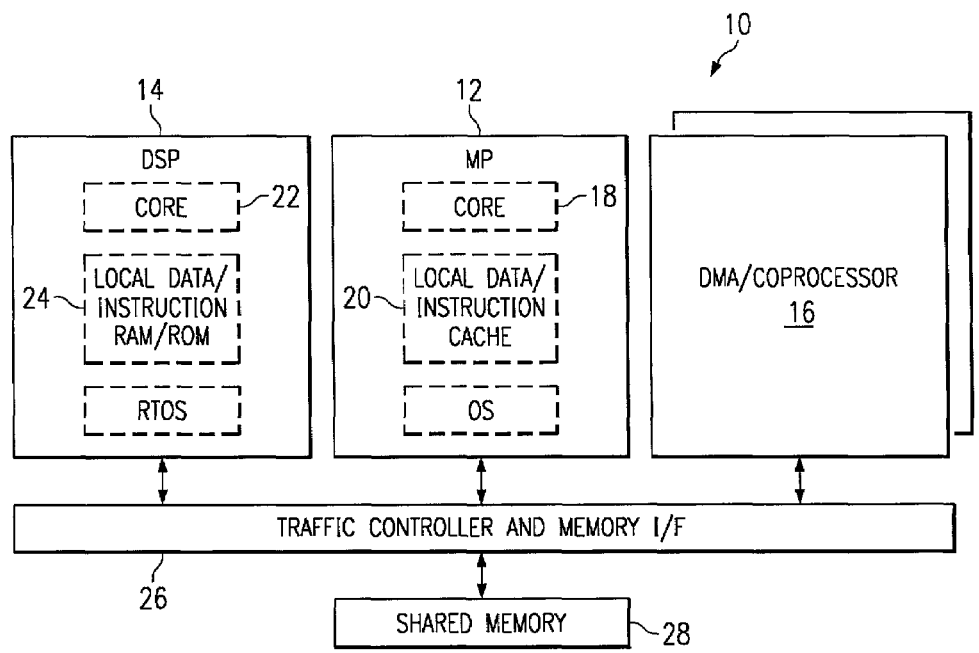
FIG. 1 illustrates a block diagram of a multiprocessor system.

FIG. 1 illustrates a general block diagram of a general multiprocessor system 10, including an MPU 12, one or more DSPs 14 and one or more DMA channels or coprocessors (shown collectively as DMA/Coprocessor 16). In this embodiment, MPU 12 includes a core 18 and a cache 20. The DSP 14 includes a processing core 22 and a local memory 24 (an actual embodiment could use separate instruction and data memories, or could use a unified instruction and data memory). A memory interface 26 couples a shared memory 28 to one or more of the MPU 12, DSP 14 or DMA/Coprocessor 16. Each processor (MPU 12, DSPs 14) can operate in full autonomy under its own operating system (OS) or real-time operating system (RTOS) in a real multiprocessor system, or the MPU 12 can operate the global OS that supervises shared resources and memory environment.

Figure 2:
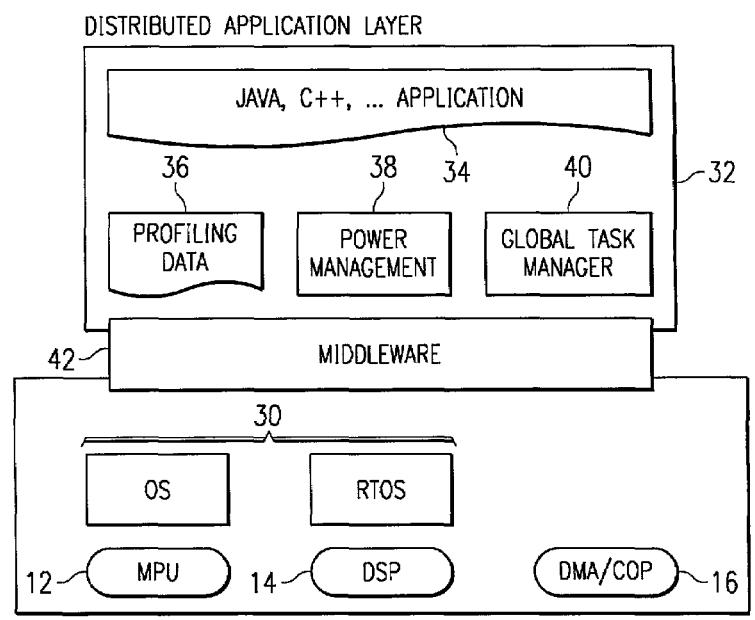
FIG. 2 illustrates a software layer diagram for the multiprocessor system.

FIG. 2 illustrates a software layer diagram for the multiprocessor system 10. As shown in FIG. 1, the MPU 12 executes the OS, while the DSP 14 executes an RTOS. The OS and RTOSs comprise the OS layer 30 of the software. A distributed application layer 32 includes JAVA, C++ and other applications 34, power management tasks 38 which use profiling data 36 and a global tasks scheduler 40. A middleware software layer 42 communicates between the OS layer 30 and the applications in the distributed application layer 32.

Referring to FIGS. 1 and 2, the operation of the multiprocessor system 10 is discussed. The multiprocessor system 10 can execute a variety of tasks. A typical application for the multiprocessor system 10 would be in a smartphone application where the multiprocessor system 10 handles wireless communication, video and audio decompression, and user interface (i.e., LCD update, keyboard decode). In this application, the different embedded systems in the multiprocessor system 10 would be executing multiple tasks of different priorities. Typically, the OS would perform the task scheduling of different tasks to the various embedded systems.

The present invention integrates energy consumption as a criterion in scheduling tasks. In the preferred embodiment, the power management application 38 and profiles 36 from the distributed applications layer 32 are used to build a system scenario, based on probabilistic values, for executing a list of tasks. If the scenario does not meet predetermined criteria, for example if the power consumption is too high, a new scenario is generated. After an acceptable scenario is established, the OS layer monitors the hardware activity to verify that the activity predicted in the scenario was accurate.

The criteria for an acceptable task scheduling scenario could vary depending upon the nature of the device. One important criterion for mobile devices is minimum energy consumption. As stated above, as electronic communication devices are further miniaturized, the smaller battery allocation places a premium on energy consumption. In many cases during the operation of a device, a degraded operating mode for a task may be acceptable in order to reduce power, particularly as the batteries reach low levels. For example, reducing the LCD refresh rate will decrease power, albeit at the expense of picture quality. Another option is to reduce the MIPs (millions of instructions per second) of the multiprocessor system 10 to reduce power, but at the cost of slower performance. The power management software 38 can analyze different scenarios using different combinations of degraded performance to reach acceptable operation of the device.

Another objective in managing power may be to find the highest MIPs, or lowest energy for a given power limit setup.

Figure 3A:
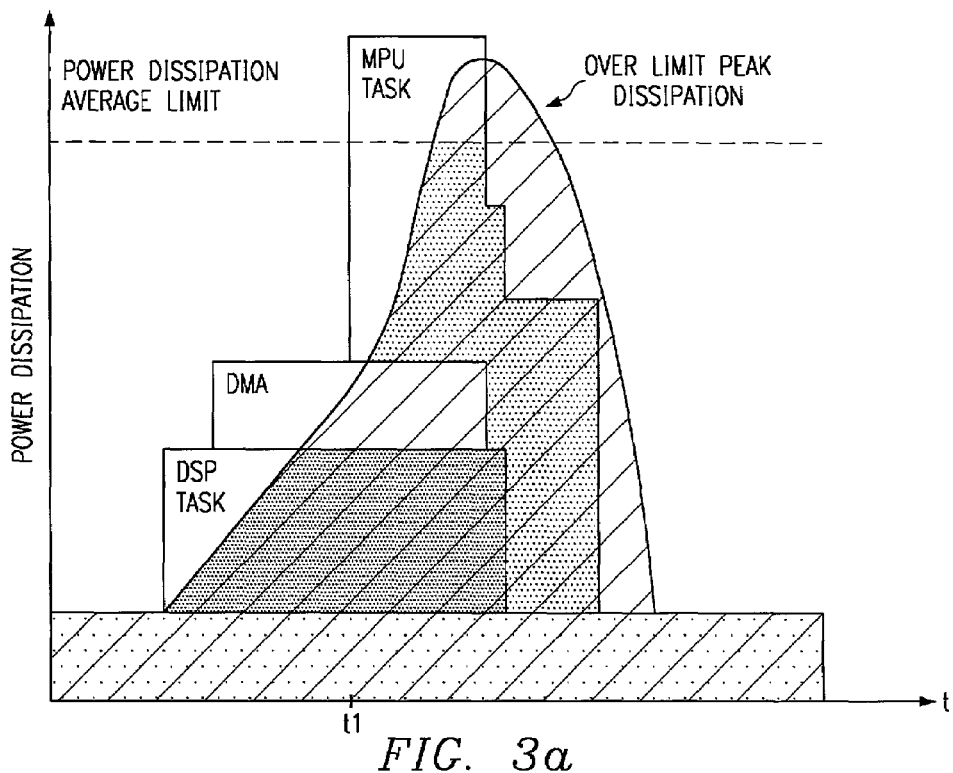
FIGS. 3A and 3B illustrate examples showing the advantages of energy management for a multiprocessor system.
Figure 3B:
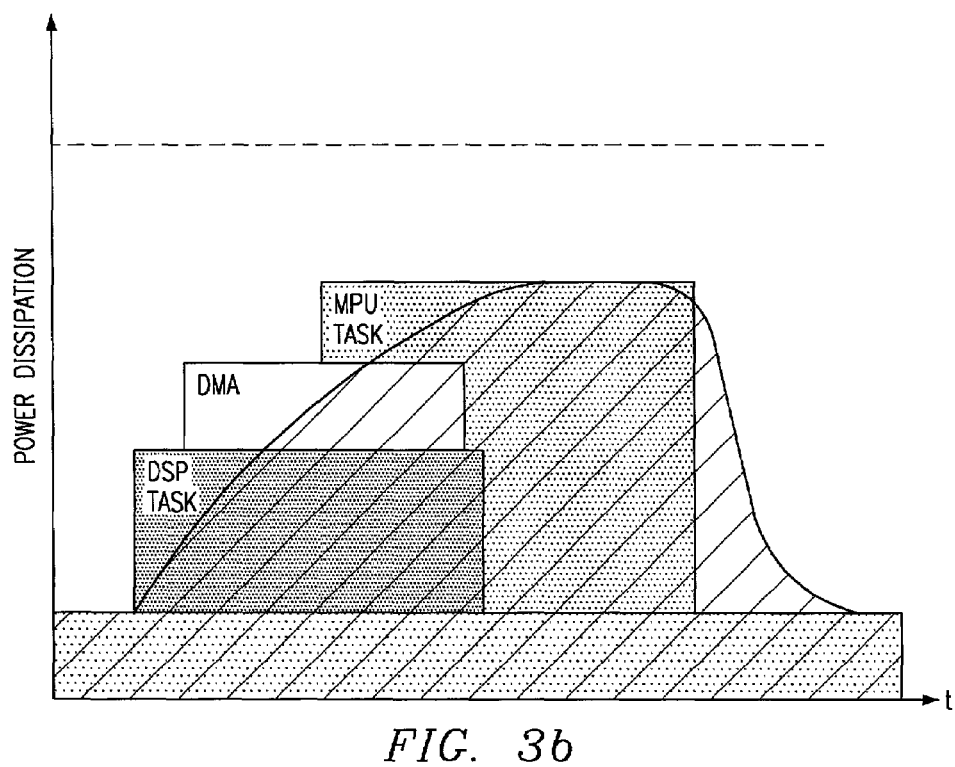

FIGS. 3a and 3b illustrate an example of using the power management application 38 to prevent the multiprocessor system 10 from exceeding an average power dissipation limit. In FIG. 3a, the DSP 14, DMA 16 and MPU 12 are concurrently running a number of tasks. At time t1, the average power dissipation of the three embedded systems exceeds the average limit imposed on the multiprocessor system 10. FIG. 3b illustrates a scenario where the same tasks are executed; however, an MPU task is delayed until after the DMA and DSP tasks are completed in order to maintain an acceptable average power dissipation profile.

Figure 4A:
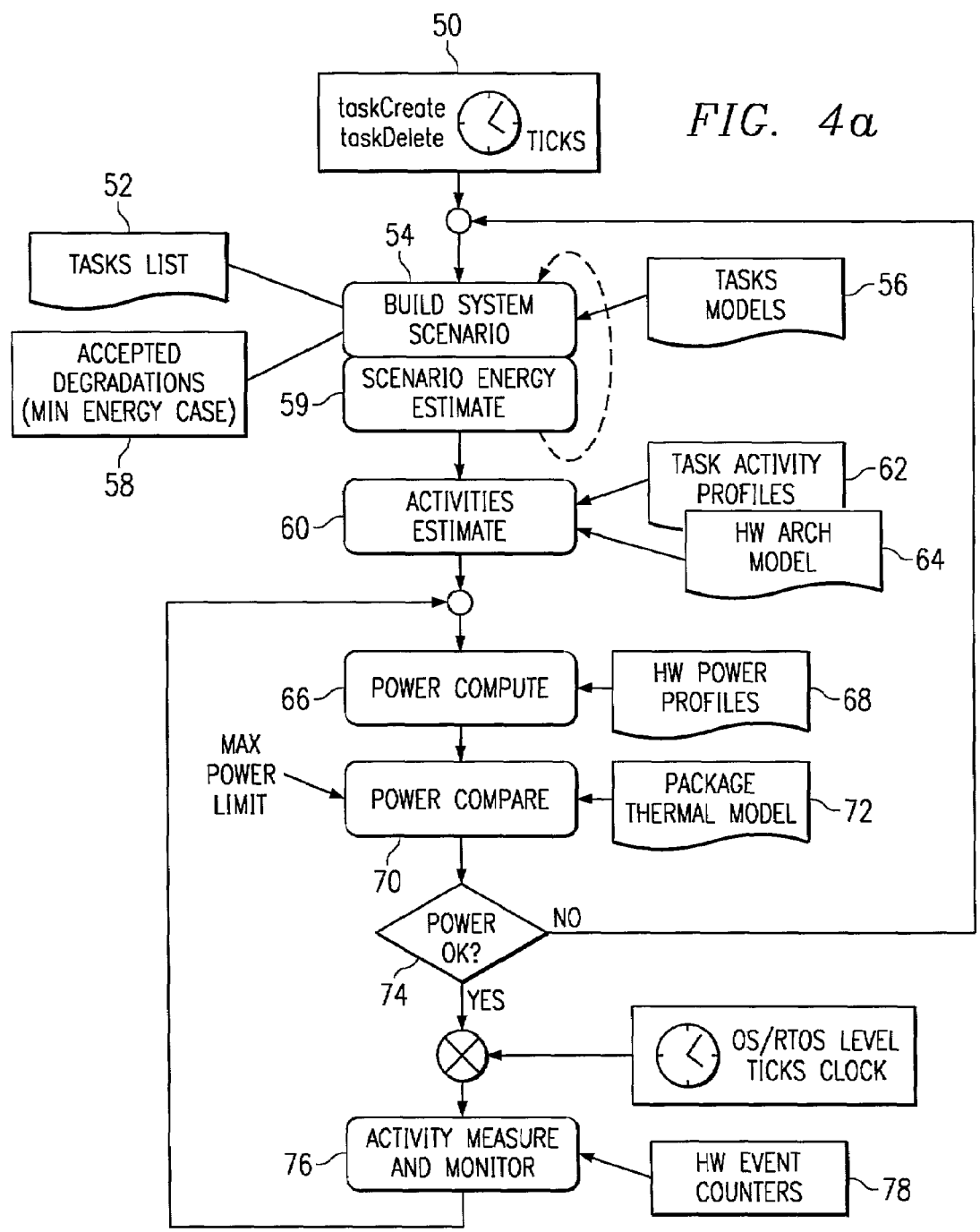
FIGS. 4a and 4b illustrate flow diagrams showing preferred embodiments for the operation of the energy management software of FIG. 2.

FIG. 4a illustrates a flow chart describing operation of a first embodiment of the power management tasks 38. In block 50, the power management tasks are invoked by the global scheduler 40, which could be executed on the MPU 12 or one of the DSPs 14; the scheduler evaluate the upcoming application and splits it into tasks with associated precedence and exclusion rules. The task list 52 could include, for example, audio/video decoding, display control, keyboard control, character recognition, and so on. In step 54, the task list 52 is evaluated in view of the task model file 56 and the accepted degradations file 58. The task model file 56 is part of the profiles 36 of the distributed applications layer 32. The task model file 56 is a previously generated file that assigns different models to each task in the task list. Each model is a collection of data, which could be derived experimentally or by computer aided software design techniques, which defines characteristics of the associated task, such as latency constraints, priority, data flows, initial energy estimate at a reference processor speed, impacts of degradations, and an execution profile on a given processor as a function of MIPs and time. The degradation list 58 sets forth the variety of degradations that can be used in generating the scenario.

Each time the task list is modified (i.e., a new task is created or a task is deleted) or when a real time event occur, based on the task list 52 and the task model 56 in step 54, a scenario is built. The scenario allocates the various tasks to the modules and provides priority information setting the priority with which tasks are executed. A scenario energy estimate 59 at a reference speed can be computed from the tasks' energy estimate. If necessary or desirable, tasks may be degraded; i.e., a mode of the task that uses fewer resources may be substituted for the full version of a task. From this scenario, an activities estimate is generated in block 60. The activities estimate uses task activity profiles 62 (from the profiling data 36 of the distributed application layer 32) and a hardware architectural model 64 (also from the profiling data 36 of the distributed application layer 32) to generate probabilistic values for hardware activities that will result from the scenario. The probabilistic values include each module's wait/run time share (effective MHz), accesses to caches and memories, I/O toggling rates and DMA flow requests and data volume. Using a period T that matches the thermal time constant, from the energy estimate 59 at a reference processor speed and the average activities derived in step 60 (particularly, effective processors speeds), it is possible to compute an average power dissipation that will be compared to thermal package model. If the power value exceeds any thresholds set forth in the package thermal model 72, the scenario is rejected in decision block 74. In this case, a new scenario is built in block 54 and steps 60, 66 and 70 are repeated. Otherwise, the scenario is used to execute the task list.

During operation of the tasks as defined by the scenario, the OS and RTOSs track activities by their respective modules in block 76 using counters 78 incorporated in the hardware. The actual activity in the modules of the multiprocessor system 10 may vary from the activities estimated in block 60. The data from the hardware counters are monitored on a T periodic basis to produce measured activity values. These measured activity values are used in block 66 to compute an energy value for this period, and hence, an average power value in block 66, as described above, and are compared to the package thermal model in block 72. If the measured values exceed thresholds, then a new scenario is built in block 54. By continuously monitoring the measured activity values, the scenarios can be modified dynamically to stay within predefined limits or to adjust to changing environmental conditions.

Total energy consumption over T for the chip is calculated as:

$$E = \int_T \sum_{modules} [\alpha \cdot Cpd \cdot f \cdot V_{dd}^2] \cdot dt \equiv \sum_{modules} \left[\sum_T (\alpha \cdot)\right] \cdot Cpd \cdot f \cdot V_{dd}^2$$

where, f is the frequency, $V_{dd}$ is the supply voltage and $\alpha$ is the probabilistic (or measured, see discussion in connection with block 76 of this figure) activity. In other words, $\Sigma_T(\alpha)*Cpd*f*V_{dd}^2$ is the energy corresponding to a particular hardware module characterized by equivalent dissipation capacitance Cpd; counters values give $\Sigma_T(\alpha)$ and E is the sum of all energies for all modules in the multiprocessor system 10 dissipated within T. Average system power dissipation W=E/T. In the preferred embodiment, measured and probabilistic energy consumption is calculated and the average power dissipation is derived from the energy consumption over period T. In most cases, energy consumption information will be more readily available. However, it would also be possible to calculate the power dissipation from measured and probabilistic power consumption.

Figure 4B:
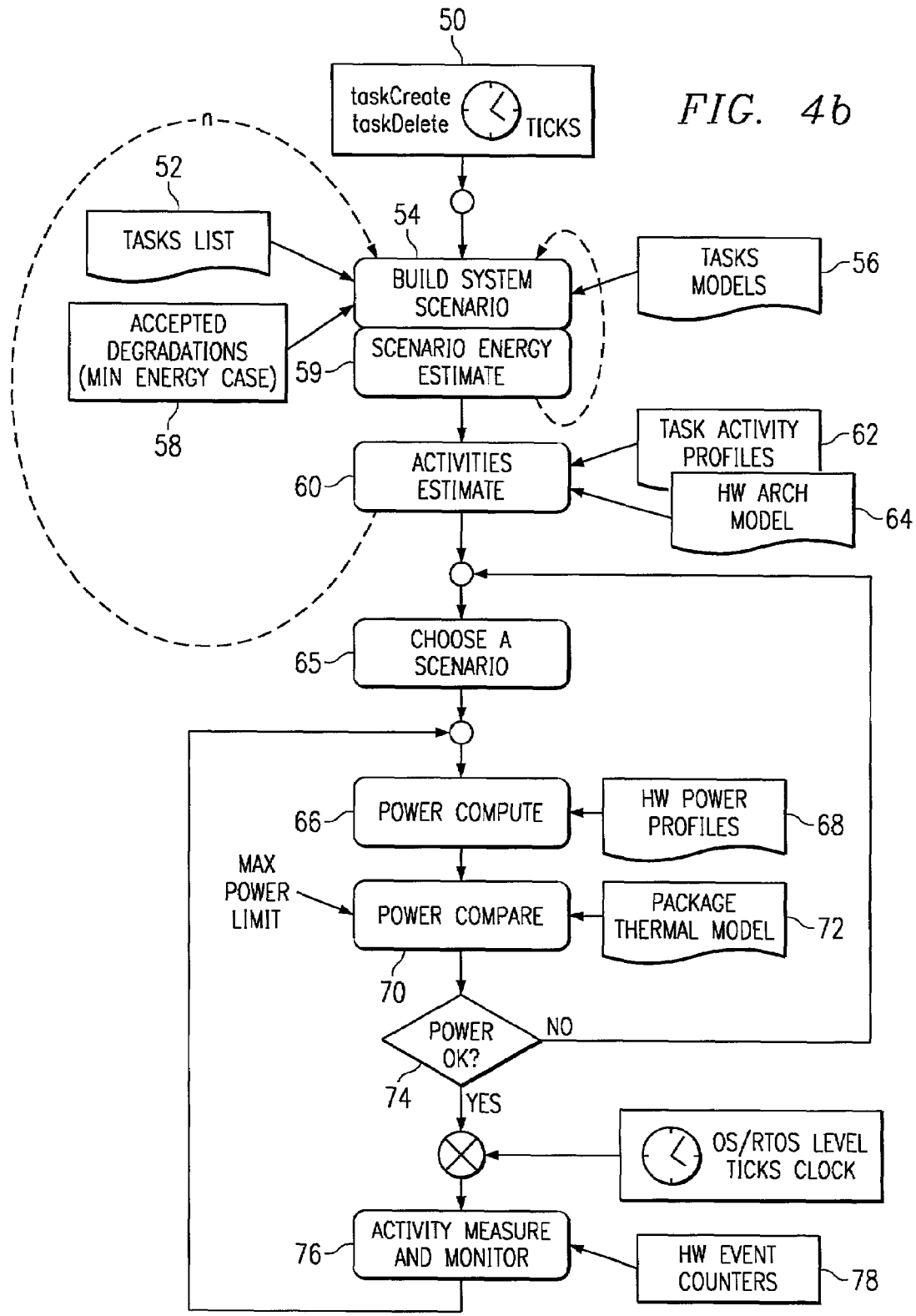

FIG. 4b is a flow chart describing operation of a second embodiment of the power management tasks 38. The flow of FIG. 4b is the same as that of FIG. 4I, except when the scenario construction algorithm is invoked (new task, task delete, real time event) in step 50, instead of choosing one new scenario, n different scenarios that match the performances constraints can be pre-computed in advance and stored in steps 54 and 59, in order to reduce the number of operations within the dynamic loop and provide faster adaptation if the power computed in the tracking loop leads to current scenario rejection in block 74, In FIG. 4b, if the scenario is rejected, another pre-computed scenario is selected in block 65. Otherwise the operation is the same as shown in FIG. 4a.

Figure 5:
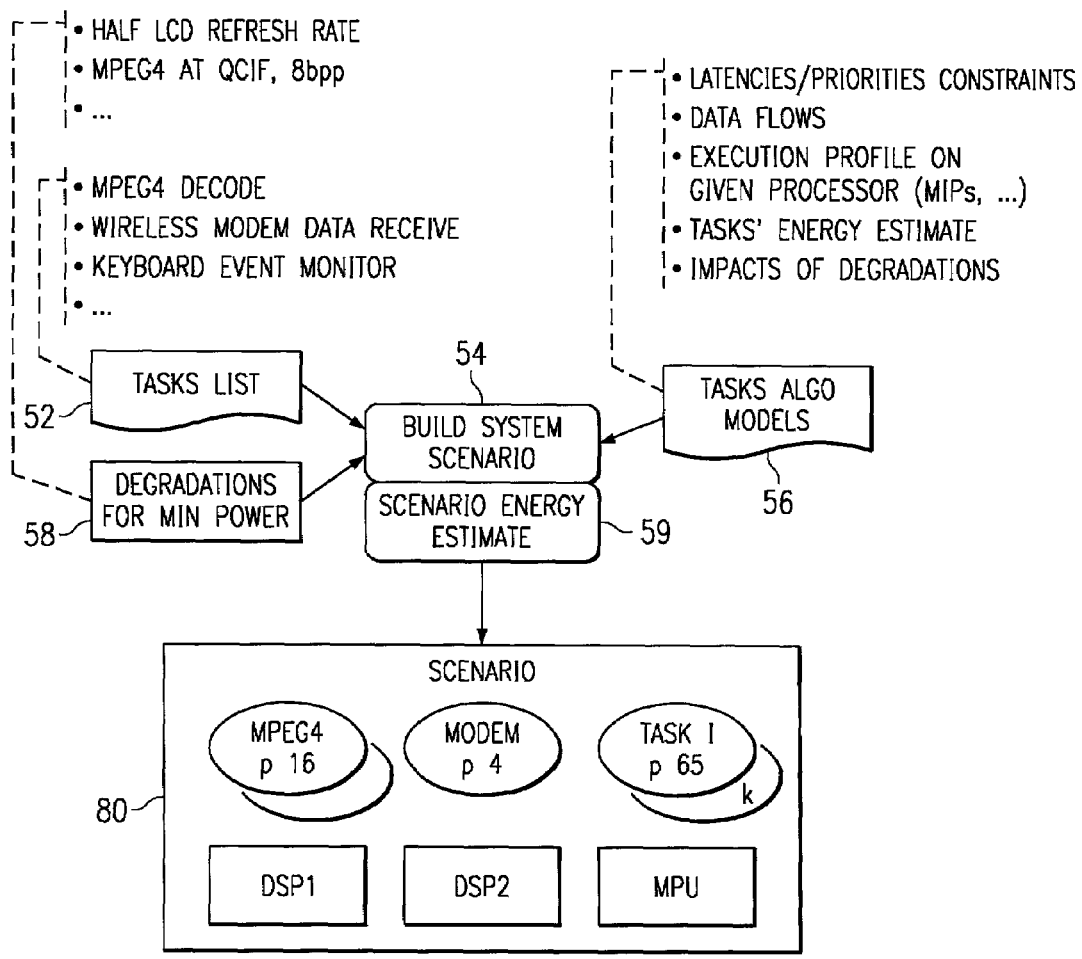
FIG. 5 illustrates the building system scenario block of FIG. 4.

FIGS. 5–8 illustrate the operation of various blocks of FIG. 3 in greater detail. The build system block 54 is shown in FIG. 5. In this block, a task list 52, a task model 56, and a list of possible task degradations 58 are used to generate a scenario. The task list is dependent upon which tasks are to be executed on the multiprocessor system 10. In the example of FIG. 5, three tasks are shown: MPEG4 decode, wireless modem data receive and keyboard event monitor. In an actual implementation, the tasks could come from any number of sources. The task model sets forth conditions which must be taken in consideration in defining the scenario, such as latency and priority constraints, data flow, initial energy estimates, and the impact of degradations. Other conditions could also be used in this block. The output of the build system scenario block is a scenario 80, which associates the various tasks with the modules and assigns priorities to each of the tasks. In the example shown in FIG. 5, for example, the MPEG4 decode task has a priority of 16 and the wireless modem task has a priority of 4.

The scenarios built in block 54 could be based on a number of different considerations. For example, the scenarios could be built based on providing the maximum performance within the packages thermal constraints. Alternatively, the scenarios could be based on using the lowest possible energy. The optimum scenario could change during operation of a device; for example, with fully charged batteries a device may operate at a maximum performance level. As the power in the batteries diminished below a preset level, the device could operate at the lowest possible power level to sustain operation.

Figure 6:
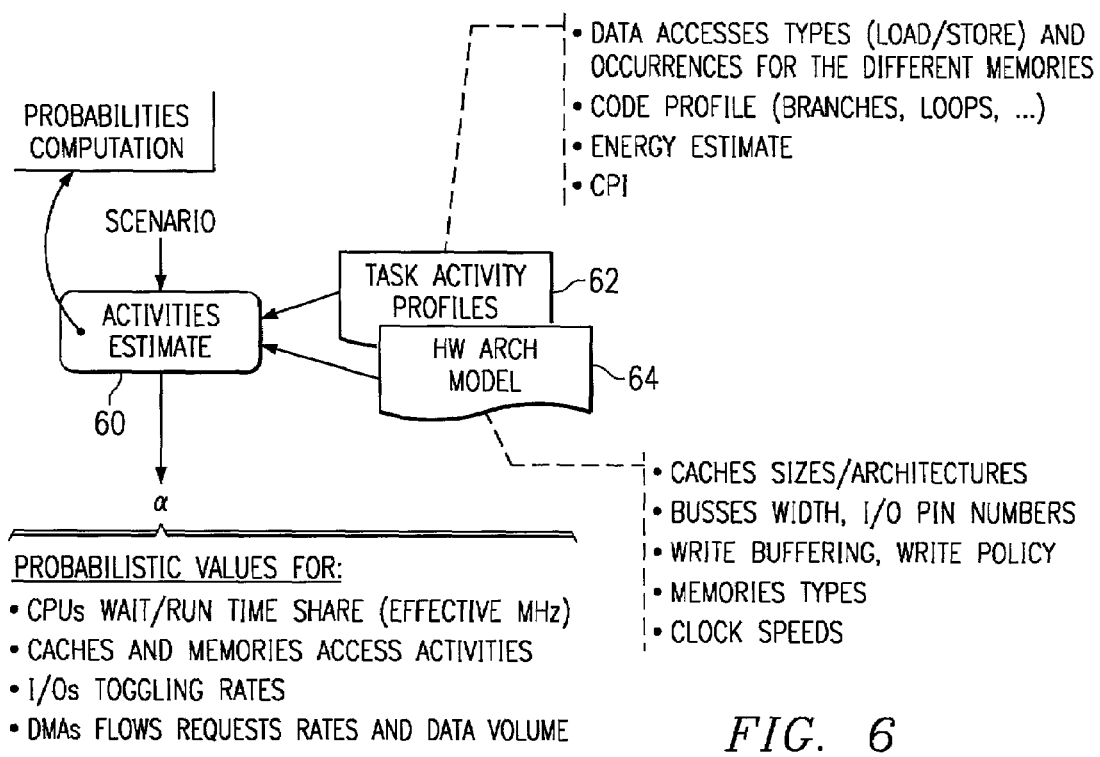
FIG. 6 illustrates the activities estimate block of FIG. 4.
Figure 7:
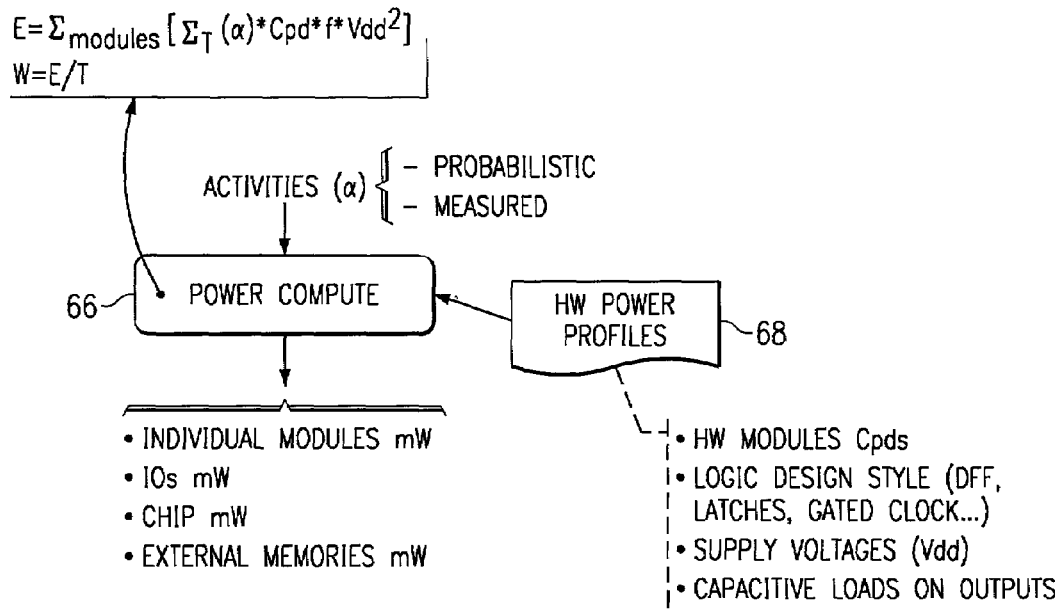
FIG. 7 illustrates the power compute block of FIG. 4.

The scenario 80 from block 54 is used by the activities estimate block 60, shown in FIG. 6. This block performs a probabilities computation for various parameters that affect power usage in the multiprocessor system 10. The probabilistic activities estimate is generated in conjunction with task activity profiles 62 and hardware architectural models 64. The task activity profiles include information on the data access types (load/store) and occurrences for the different memories, code profiles, such as the branches and loops used in the task, and the cycles per instruction for instructions in the task. The hardware architectural model 64 describes in some way the impact of the task activity profiles 62 on the system latencies, that will permit computation of estimated hardware activities (such as processor run/wait time share). This model takes into account the characteristics of the hardware on which the task will be implemented, for example, the sizes of the caches, the width of various buses, the number of I/O pins, whether the cache is write-through or write back, the types of memories used (dynamic, static, flash, and so on) and the clock speeds used in the module. Typically, the model can consist of a family of curves that represent MPU and DSP effective frequency variations with different parameters, such as data cacheable/non-cacheable, read/write access shares, number of cycles per instruction, and so on. In the illustrated embodiment of FIG. 6, values for the effective frequency of each module, the number of memory accesses, the I/O toggling rates and the DMA flow are calculated. Other factors that affect power could also be calculated.

Figure 8:
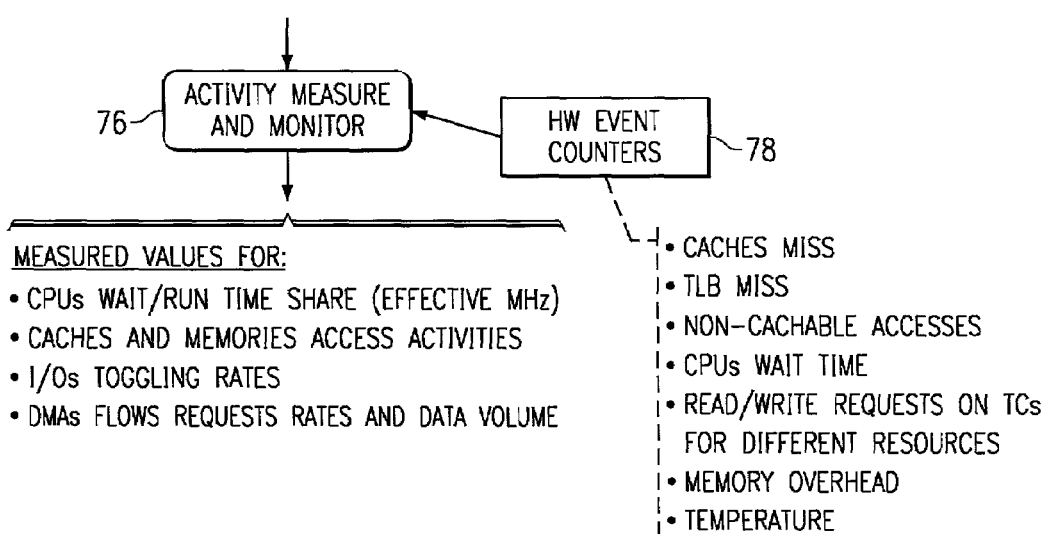
FIG. 8 illustrates the activity measure and monitor block of FIG. 4.

The power compute block 66 is shown in FIG. 8. In this block, the probabilistic activities from block 60 or the measured activities from block 76 are used to compute various energy values and, hence, power values over a period T. The power values are computed in association with hardware power profiles, which are specific to the hardware design of the multiprocessor system 10. The hardware profiles could include a Cpd for each module, logic design style (D-type flip-flop, latches, gated clocks and so on), supply voltages and capacitive loads on the outputs. Power computations can be made for integrated modules, and also for external memory or other external devices.

Activity measure and monitor block 76 is shown in FIG. 8. Counters are implemented throughout the multiprocessor system 10 to measure activities on the various modules, such as cache misses, TLB (translation lookaside buffer) misses, non-cacheable memory accesses, wait time, read/write requests for different resources, memory overhead and temperature. The activity measure and monitor block 76 outputs values for the effective frequency of each module, the number of memory accesses, the I/O toggling rates and the DMA flow. In a particular implementation, other values may also be measured. The output of this block is sent to the power compute block 66.

Figure 9:
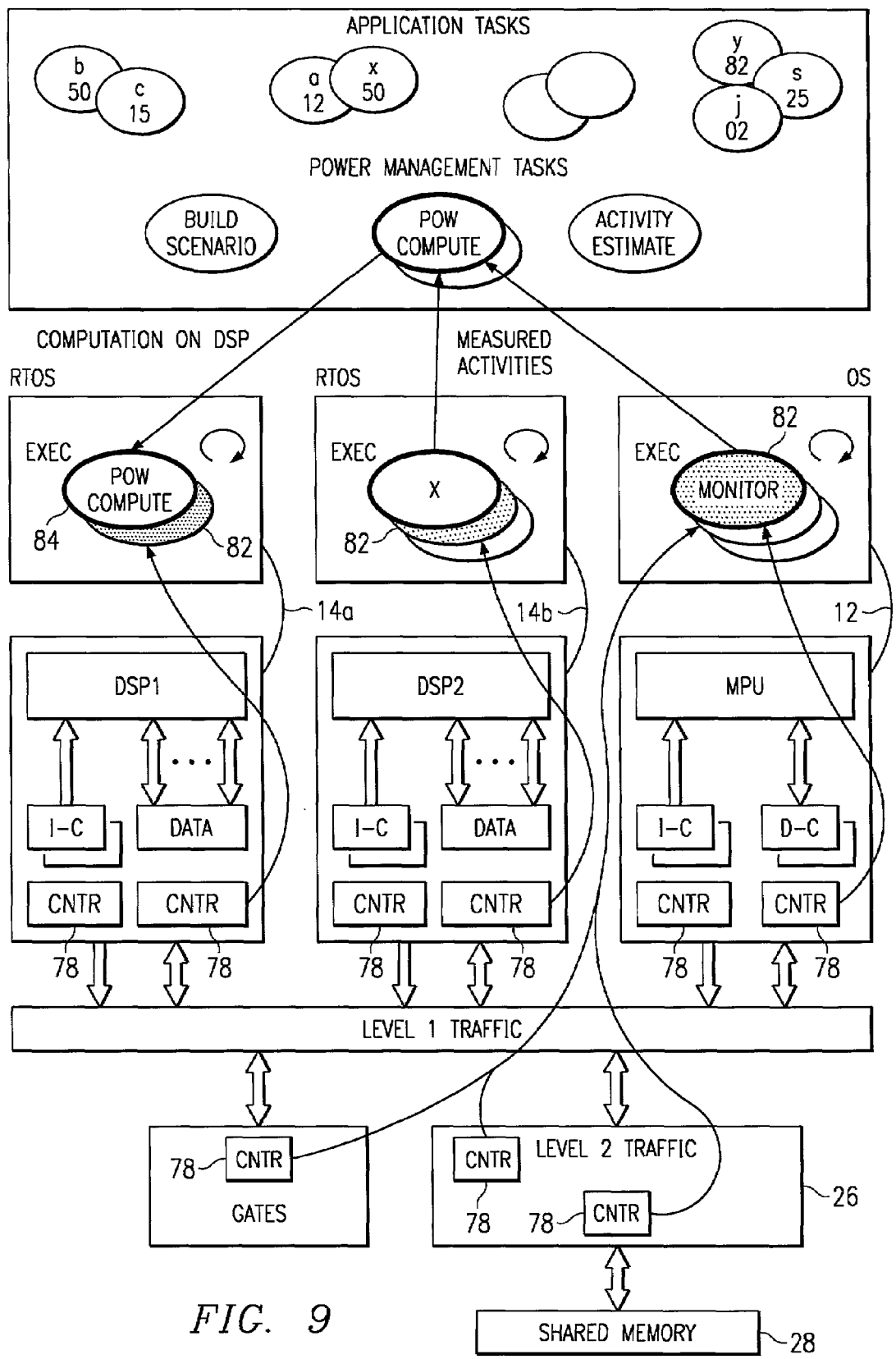
FIG. 9 illustrates a block diagram showing the multiprocessor system with activity counters.

FIG. 9 illustrates and example of a multiprocessor system 10 using power/energy management software. In this example, the multiprocessor system 10 includes a MPU 12, executing an OS, and two DSPs 14 (individually referenced as DSP1 14a and DSP2 14b), each executing a respective RTOS. Each module is executing a monitor task 82, which monitors the values in various activity counters 78 throughout the multiprocessor system 10. The power compute task is executed on DSP 14a. The various monitor tasks retrieve data from associated activity counters 78 and pass the information to DSP 14a to calculate a power value based on measured activities. The power management tasks, such as power compute task 84 and monitor task 82, can be executed along with other application tasks.

In the preferred embodiment, the power management tasks 38 and profiles 36 are implemented as JAVA class packages in a JAVA real-time environment.

Figure 10:
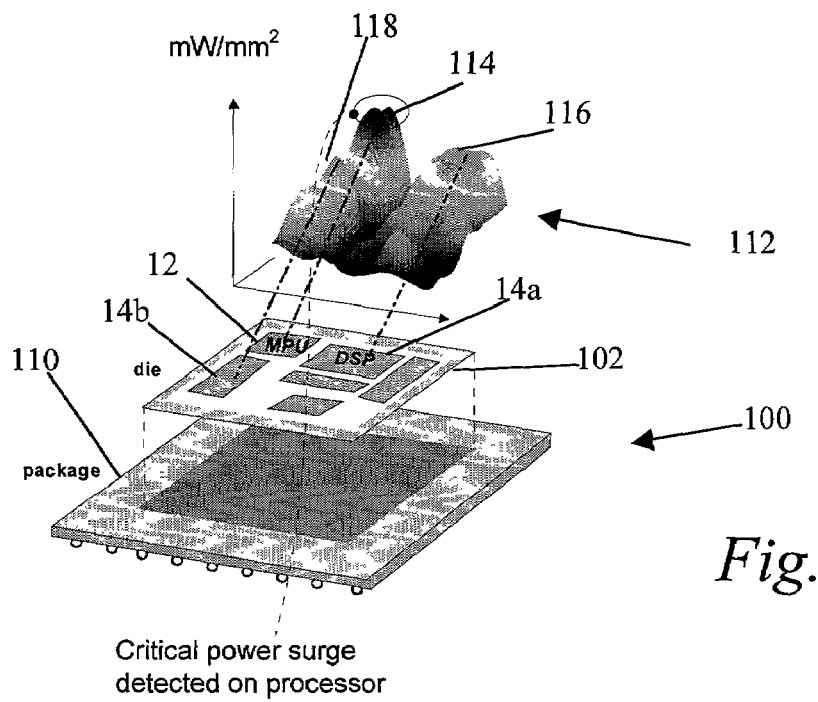
FIG. 10 illustrates an exploded view of a processing device of the type shown in the block diagram of FIG. 9 along with a graph of dissipated power (mW/mm$^2$) during operation.

FIG. 10 illustrates an exploded view of a processing device 100, of the type shown in FIG. 9, with the layout of various components displayed on a semiconductor die 102. For example, the boundaries of components MPU 12, DSP1 14a and DSP2 14b are shown on FIG. 10 on die 102. Die 102 would be mounted within packaging 110. Above die 102, an example of a power dissipation profile 112 that could occur during operation of the processing device 100 is shown. The power dissipation profile 112 shows peaks, 114, 116 and 118, which are associated with the operation of respective components. As can be seen from this Figure, power dissipation peak 114 exceeds a predetermined safe range.

The power dissipation profile 102 can be computed from the events detected by various counters 78 associated with the components as shown in FIG. 9. A temperature field for the die may be computer from the dissipated power profile. When a critical power surge, such as the one shown at peak 114, is detected, a rescheduling of tasks may be computed by the power computing task 84. In this case, several solutions may be available to bring peak 114 down to an acceptable level. First, if the task running on MPU 12 was a high priority task, it might be possible to reschedule lower priority tasks on DSP1 14a or DSP2 14b. Since the power dissipation in the areas designated by DSP1 14a and DSP2 14b contribute to the power dissipation in the area designated by MPU 12, rescheduling one or more of the tasks using DSP1 14a or DSP2 14b may reduce the peak. Alternatively, it may be possible to reduce the power dissipation shown at peak 114 by reducing the frequency of the MPU 12, DSP1 14a and DSP2 14b.

Counters 78 can measure activity in many areas of the die 102. For example, for MPU 12, a first counter could measure activity of the instruction cache, a second counter could measure activity of the data cache and a third counter could measure activity of the MAC (multiplier accumulator). The counters 78 need not be physically located in the area of the circuit whose activity is being measured. It would also be possible for a single counter to measure activity that affects multiple areas of the die 100.

Because the effect of an activity can be translated directly to an estimate of power dissipation in one or more areas of the die 102, an ongoing measurement of activities can identify potentially dangerous power surges that could affect device performance. Thresholds can be set to identify dangerous situations.

Figure 11:
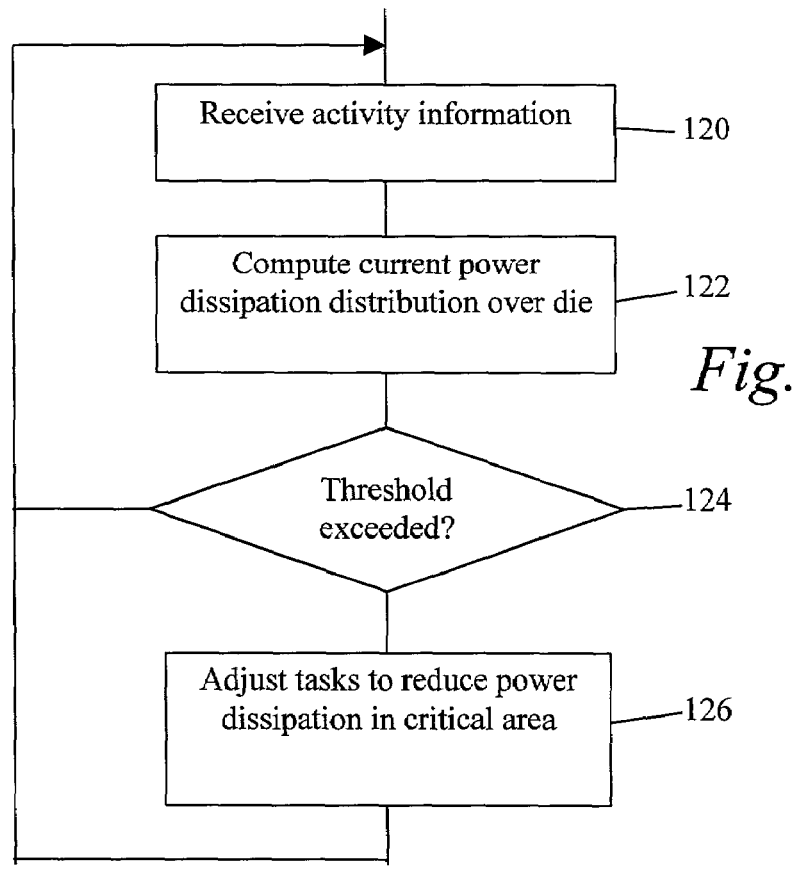
FIG. 11 illustrates a flow chart describing the use of area-specific temperature data for task scheduling.

FIG. 11 illustrates a flow chart describing operation of scheduling events to avoid critical temperature effects in a specific area of a die. In step 120, power management software receives activity information. This information is used to compute a power dissipation distribution over the semiconductor die 102 in step 122. The power dissipation distribution is analyzed in step 124. If a threshold is exceeded in any area of the semiconductor die 102, the tasks are adjusted in step 126 to reduce the power dissipation in that area.

While the power dissipation distribution is estimated using activity measurements, it would be possible to measure temperatures directly at various points on the semiconductor and schedule tasks based on actual temperature measurements. For example, the temperature could be estimated by a measured change of an I–V characteristic of a PN junction.

In addition to monitoring activity on the various components during operation of the device 100, the counter 78 may be used to derive information necessary to profile tasks for area-specific temperatures, in order to create schedules that avoid critical temperatures in any area of the die 102 during the execution of the tasks. This could be performed as shown in FIGS. 4a and 4b, with the thresholds be applied to various areas of the device 100.

This aspect of the present invention provides significant advantages over the prior art. First, it provides for a fully dynamic power management based on the temperature, or estimated temperature, of various areas of a device. As the tasks executed in the device 100 change, the power management can build new scenarios to ensure that temperature thresholds are not exceeded in any area of the device.

Figure 12:
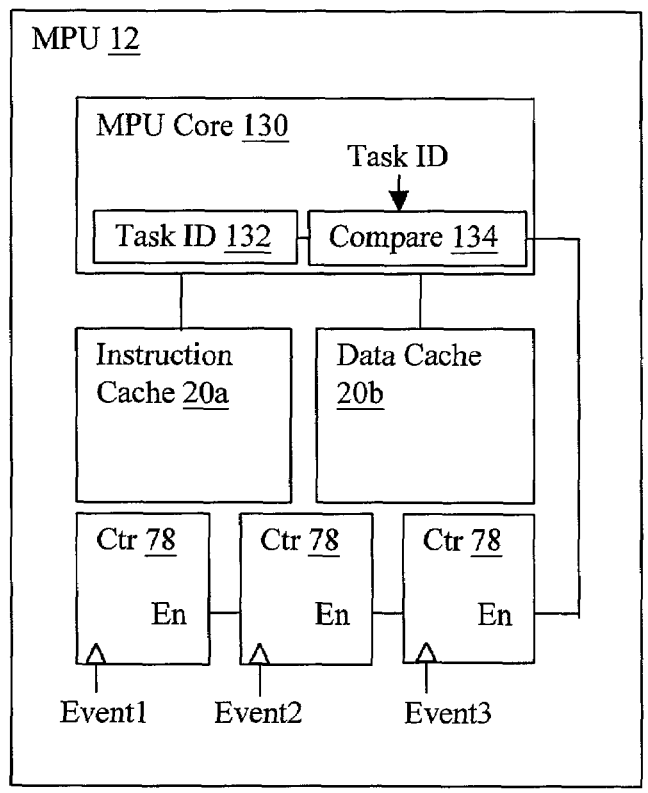
FIG. 12 illustrates a block diagram of an embodiment for providing accurate measurements of activity associated with a task.

The power management software is transparent to the various tasks that it controls. Thus, even if a particular task does not provide for any power management, the power management software assumes responsibility for executing the task in a manner that is consistent with the power capabilities of the device 100. FIG. 12 illustrates an embodiment of the invention that accurately measures energy information regarding the operation of a specific task. By increasing the accuracy of the energy information associated with a task, the probability of success for a proposed global scenario is similarly increased. FIG. 12 provides a more detailed block diagram of MPU 12. An MPU core 130 indudes a TaskID register 132 and a compare circuit 134. Core 130 is coupled to instruction cache 20a mand data cache 20b. Counters 78 monitor activity within the core. Counters 78 have enable ports (En) coupled to the output of compare circuit 134. Each processor that may independently execute a task (i.e, "autonomous" processors such as an MPU or DSP, but generally not a co-processor or a DMA physical chaimel) may have a TaskID register 132 and a compare circuit 134. Thus, the device shown in FIG. 9 might have three TaskID registers 132 corresponding to the MPU 12, DSP1 14a and DSP2 14b.

In operation, each task being executed by the processing system 10 has a unique identification tag, the Task ID. When a task is being executed, its Task ID is stored in the TaskID register 132. When an accurate estimate of system energy consumption is being measured for a specific task, the Task ID of the specific task is loaded into comparator 134 (the Task ID of the task being monitored may be stored within comparator 134 or in a register or other memory). Comparator 134 outputs a first logical signal (for example, a logical "1") when the identifier in the TaskID register matches the Task ID loaded into comparator 134. Similarly, comparator 134 outputs a second logical signal (for example, a logical "0") when the identifier in the TaskID register is different from the Task ID loaded into comparator 134.

The output of the comparator 134 is coupled to enable ports of the various counters on the device 10. When there is a match in the comparator 134, the counters are enabled to measure activity associated with the task. When there is a mismatch, the counters are disabled, such that activities associated with other tasks are not measured. Some hardware systems are shared between multiple processors. Therefore, in order to accurately measure activity on these shared systems attributable to a distinct task, multiple counters can be coupled to respective compare circuits 134. Alternatively, the counter on the shared hardware system could have a Task ID register and comparator to allow counting only when a certain task was active.

This embodiment can be used for generating energy information for task profiles. The energy information can be gathered in an "off-line" mode, where the device 10 is being operated for the purpose of gathering the energy information, or in an "on-line" mode, where the information is gathered during actual operation of the device 10, and the task profiles 36 are updated dynamically during the operation of the device to improve scheduling as tasks are created and terminated.

In addition to energy profiling, the task-specific events monitoring capabilities described above can be used for other purposes. One such purpose would be to provide enhanced debugging techniques. For example, a breakpoint could be set when an activity counter reaches a certain value for a given task.

During operation of the device 10, for each autonomous processor, the Task ID of the current task is stored in the TaskID register 132. In a multitasking system, a processor switches between each current task, giving the appearance that all of the current tasks are being executed simultaneously. As each task is loaded by the processor (the "active" task), various state information will be restored to the processor. In the embodiment shown in FIG. 12, the Task ID associated with the active task is stored in the TaskID register 132 as the state information for the task is restored. During times when the contents of the TaskID register 132 for the autonomous processor matches the Task ID of the task being monitored, then the counters 78 will be enabled to accumulate activity information. When the processor switches to a different task, the counters will ignore activity. Thus, accurate information regarding activity associated with a task during multitasking operations can be obtained.

The embodiment shown in FIG. 12 can be used in conjunction with the embodiment shown in FIGS. 10 and 11 to obtain area-specific temperate data, if desired.

This aspect of the invention provides for more accurate profile data that may be used for scheduling tasks. By providing better energy information, the success rate of computing global scenarios, as discussed in connection with FIGS. 4a and 4b.

Figure 13:
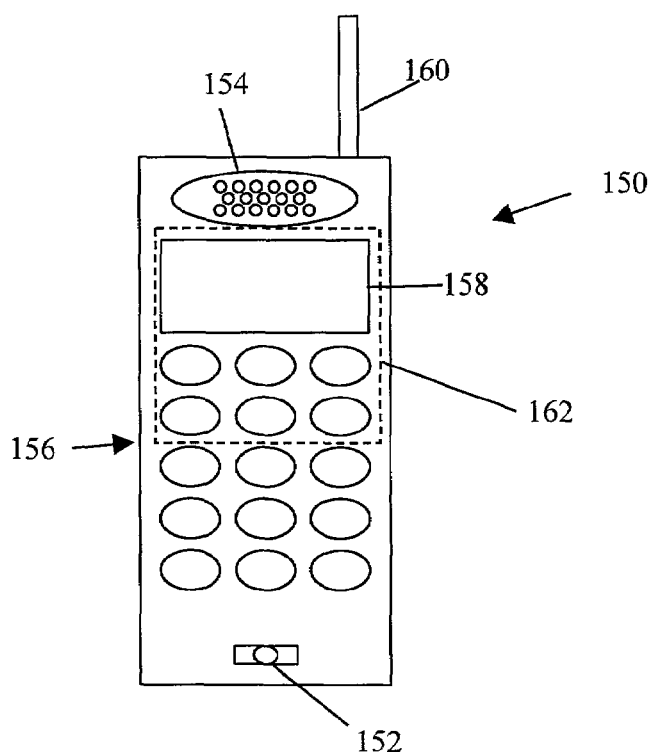
FIG. 13 illustrates a mobile communications device using the invention.

FIG. 13 illustrates an implementation of a mobile communications device 150 with microphone 152, speaker 154, keypad 156, display 158 and antenna 140. Internal processing circuitry 162 includes one or more processing devices with the energy saving features described herein. It is contemplated, of course, that many other types of communications systems and computer systems may also benefit from the present invention, particularly those relying on battery power. Examples of such other computer systems include personal digital assistants (PDAS), portable computers, personal digital assistants (PDAs), smart phones, web phones, and the like. As power dissipation is also of concern in desktop and line-powered computer systems and micro-controller applications, particularly from a reliability standpoint, it is also contemplated that the present invention may also provide benefits to such line-powered systems.

Telecommunications device 150 includes microphone 152 for receiving audio input, and speaker 154 for outputting audible output, in the conventional manner. Microphone 152 and speaker 154 are connected to processing circuitry 162 which receives and transmits audio and data signals.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method for controlling execution of multiple tasks in a processing circuit including several processing modules, comprising the steps of:
    determining temperature-associated information at various areas of the processing circuit; and
    in response to temperature-associated information indicating an excessive temperature at an area associated with a first of said processing modules, modifying parameters for executing tasks on one or more adjacent processing modules in order to reduce heat generated by the adjacent processing modules and contributing to the excessive temperature at the first processing module.

2. The method of claim 1 wherein said determining step comprises the step of monitoring operations executed by said modules.

3. The method of claim 1 wherein said determining step comprises the step of calculating power dissipation information at various locations in said processing circuit.

4. The method of claim 1 wherein said determining step comprises the step of calculating a current temperature at various locations in said processing circuit.

5. A method for controlling execution of multiple tasks in a processing circuit including a plurality of processing modules, comprising the steps of:
    generating a task allocation scenario for allocating multiple tasks among the plurality of processing modules;
    prior to executing the tasks, estimating temperature-associated information for various locations in the processing circuit as would occur if the tasks were executed according to the scenario;
    determining whether a temperature threshold would be exceeded by executing the tasks according to the scenario.

6. The method of claim 5 wherein said step of generating a task allocation scenario comprises the step of receiving a task list describing the tasks to be executed and a task model describing the tasks.

7. The method of claim 6 wherein the task model includes initial area-specific power dissipation estimates for each task.

8. A processing circuit including a plurality of processing modules for executing multiple tasks comprising:
    circuitry for determining temperature-associated information at various areas of the processing circuit; and
    circuitry responsive to temperature-associated information indicating an excessive temperature at an area associated with a first of said processing modules for modifying parameters for executing tasks on one or more adjacent processing modules in order to reduce heat generated by the adjacent processing modules and contributing to the excessive temperature at the first processing module.

9. The processing circuit of claim 8 wherein said determining circuitry comprises circuitry for monitoring operations executed by said processing modules.

10. The processing circuit of claim 8 wherein said determining circuitry comprises circuitry for calculating power dissipation information at various locations in said processing circuit.

11. The processing circuit of claim 8 wherein said determining circuitry comprises circuitry for calculating a current temperature at various locations in said processing circuit.

12. A processing circuit comprising:
a plurality of processing modules for executing multiple tasks; and
circuitry for generating a task allocation scenario for allocating the tasks among the processing modules, estimating temperature-associated information for various locations in the processing circuit as would occur if the tasks were executed according to the scenario and determining whether a temperature threshold would be exceeded if the tasks were to be executed according to the scenario.

13. The processing circuit of claim 12 wherein said circuitry for generating a task allocation scenario comprises circuitry for receiving a task list describing the tasks to be executed and a task model describing the tasks.

14. The processing circuit of claim 13 wherein the task model includes initial area-specific power dissipation estimates for each task.

15. A mobile communications device comprising:
a plurality of processing modules for executing a plurality of tasks;
an antenna for receiving and transmitting signals; and
receiver/transmitter circuitry coupled to said antenna for sending and receiving audio and data signals, said receiver/transmitter circuitry including a processing circuit comprising:
circuitry for determining temperature-associated information at various areas of the processing circuit; and
circuitry responsive to temperature-associated information indicating an excessive temperature at an area associated with a first of said processing modules for modifying parameters for executing tasks on one or more adjacent processing modules in order to reduce heat generated by the adjacent processing modules and contributing to the excessive temperature at the first processing module.

* * * * *